Patented Nov. 25, 1952

2,619,404

UNITED STATES PATENT OFFICE 2,619,404

PROCESS FOR PRODUCING POTASSIUM SALTS FROM SOLUTIONS, PARTICULARLY SEA WATER, SALT LAKES, AND SALT LYES

Anders Skogseid, Oslo, Norway, assignor to Norsk Hydro-Elektrisk Kvaelstofaktieselskab, Oslo, Norway No Drawing. Application October 22, 1945, Serial No. 623,881. In Norway September 2, 1943

Section 1, Public Law 690, August 8, 1946
Patent expires September 2, 1963

3 Claims. (Cl. 23—50)

It is known that highly nitrated secondary aromatic amines can be used for precipitating potassium from sea water, salt lake water, salt lyes etc. For this process several filtrations are necessary. Firstly a filtration to obtain the potassium salt, then a filtration to recover the surplus of precipitating agent, and finally a filtration to regain the precipitating agent after the decomposition of the potassium compound with acid.

We have now found that certain cation exchangers, are generally potassium selective, i. e. potassium is more firmly bound in these exchangers than other present ions, such as calcium, magnesium and sodium.

The present invention has for its object a process for the treatment of solutions containing potassium-ions such as per example seawater, water from salt lakes or salt springs, various brines, etc. in order to produce solutions richer in potassium. The characteristic feature of the invention is that the solution is conducted through a potassium selective ion exchanger comprising macromolecules of highly nitrated secondary aromatic amines or metal compounds of poly-vinyl-pentanitro-diphenylamine during which process potassium is absorbed, and eventually after washing is treated with acid or a salt which exchanges potassium for its own cations. The method of preparing the above compounds is disclosed in application Serial No. 754,064, filed June 11, 1947. Thereby a more concentrated potassium solution is obtained from which potassium salt may be produced.

In accordance with the invention the great advantage is that the potassium binding compound remains at rest while the potassium containing solution only, is moving. Therefore the above mentioned filtrations are avoided and at the same time other advantages are obtained.

An ion exchanger of this kind will never be so selective that it binds only potassium. An equilibrium will be arrived at between the ions in the exchanger and the ions in the solution passing through the same. But in the first place it is possible by expelling the ions from the exchanger with an acid, preferably of medium concentration and in equivalent amount, to obtain a new highly concentrated salt lye strongly enriched in potassium, absolutely as well as relatively. On the other hand it is possible by utilising the difference in the strength with which the ions are bound to the exchanger, when expelling with acids or salt solutions, to collect the expelled salts in separate fractions and thus obtain practically pure concentrated salts solutions.

If a salt solution contains besides potassium, calcium, magnesium and sodium for example and has been conducted through the exchanger these ions may be expelled from the exchanger in one of the following ways. One or more of the said ions may be missing in the salt solution to be treated.

(a) By means of an acid the ions may be expelled in such a way that all solution is collected separately until K. appears. K. is the last to leave the exchanger, and a practically pure potassium salt solution is then obtained.

If, for instance, nitric acid is used $NaNO_3$ leaves first, then $Mg(NO_3)_2$, then $Ca(NO_3)_2$ and lastly $KNO_3$. The salts are collected separately for further treatment.

(b) By means of a KCl-solution which may be very thin it is possible by means of K˙ to expel the other ions. When only K˙ or practically only K˙ remains in the exchanger this is expelled with $HNO_3$. Hereby there is obtained a concentrated $KNO_3$-solution. This accordingly is a method for transforming KCl to $KNO_3$.

(c) The other ions are expelled with $KNO_3$, and K˙ is expelled lastly with $HNO_3$ (or $SO_2$). Method otherwise as under (a).

(d) $Ca(NO_3)_2$ is used for expelling. The fractions are collected as under (a); but $KNO_3$ and $Ca(NO_3)_2$ arrive together in the third fraction. The exchanger is here directly regenerated as a Ca-compound and a certain amount of $Ca(NO_3)_2$ has been transformed to other nitrates in proportions determined by the ion equilibrium in the exchanger.

(e) $CaCl_2$ is used for expelling whereby KCl and $CaCl_2$ are obtained together in a solution from which the salts may be derived.

(f) In case the other ions are expelled with $KNO_3$ or KCl, K˙ may be expelled with carbonic acid, and $K_2CO_3$ is directly produced.

(g) The ions are expelled from the exchanger by means of $SO_2$. $Na_2SO_3$ will then leave first, then $K_2SO_3$, and thereafter Mg˙˙ and Ca˙˙ will leave, mainly as bisulfites. By converting the $Na_2SO_3$- and $K_2SO_3$-solutions with $Ca(OH)_2$ NaOH and KOH may be produced, $CaSO_3$ being precipitated.

Example 1

As exchanger was used the Ca-compounds of a mixture of poly-4'-vinyl-(2.4.6.2'.6'-pentanitro-diphenylamine) and poly-2'-vinyl-(2.4.6.4'.6'-pentanitro-diphenylamine). Through this exchanger was conducted sea water until equilibrium was reached between the ions in the exchanger and the ions in the sea water. The exchanger was washed and the ions expelled with HNO₃. The result is given below.

|  | In sea water, eqv. percent | In the exchanger at the equilibrium, eqv. percent | Enrichment in eqv. relation |
|---|---|---|---|
| Na· | 79.3 | 51.40 | 0.65 |
| K· | 1.67 | 10.00 | 6.00 |
| Mg· | 14.10 | 22.80 | 1.62 |
| Ca· | 5.20 | 15.80 | 3.04 |

*Example 2*

The same exchanger was used as in Example 1 and through this exchanger was conducted a salt lye of approximately the same content as that one produced in accordance with Example 1. The procedure is the same as under Example 1. The result is given below.

|  | In salt lye, eqv. percent | In the exchanger at the equilibrium, eqv. percent | Enrichment in eqv. relation | Enrichment from sea water to second equilibrium |
|---|---|---|---|---|
| Na· | 49.45 | 16.05 | 0.325 | 0.211 |
| K· | 9.74 | 30.15 | 3.10 | 18.60 |
| Mg· | 23.31 | 27.00 | 1.16 | 1.88 |
| Ca· | 17.50 | 26.80 | 1.53 | 4.65 |

It is known to produce synthetic compositions comprising groups such as: —OH, —COOH, —CH₂.SO₃H and —SO₃H and to use the same as cation exchangers (R. Griessbach, Angew. 52 (1939) 215). It is also known to produce synthetic compositions comprising amino- and imino-groups, but these, owing to the basic nature of the groups, can only be used as anion exchangers.

We have now found, that secondary amino groups (imino groups) may be made acid even in macromolecular compounds by the introduction of negative (polarizing) groups in the same manner as in monomer compounds, and that the macromolecular compounds thus obtained, may be used as cation exchangers. Hereby a new group, the imino group, is accordingly added to the groups mentioned above as carriers of the cation exchanging properties.

Representatives of these new cation exchangers are, first of all, macromolecular highly nitrated secondary cyclic amines.

In the production of the cation exchangers start is made with macromolecular compositions comprising cyclic amines, for example poly-amino-styrenes, poly - vinyl - naphthyl - amines, condensation products of the type of anilines or naphthylamines with aldehydes or amines produced from condensation products of phenols or naphthols or their substitution products with aldehydes. These macromolecular cyclic amines are condensed in a manner known per se with nitrated halogen benzenes, halogen naphthalines, etc., for instance picrychloride and 1-chlor-2.4.5-trinotronaphthaline or 2.4.6-trichlor-1.3.5.-trinitro-benzene. If condensed with a compound as picrylchloride there is obtained only one imino group in the elementary molecule of the exchanger. If, however, condensed with a dichlor- or trichlor compound, such as 2.4.6-tri-chlor-1.3.5.-trinitrobenzene, the condensation product may again be condensed with anilines or naphthylamines, and there is obtained two or three imino groups in the elementary molecule of the exchanger. Hereby the capacity of the exchanger is also correspondingly increased.

The hydrogen in the imino groups, obtained by above mentioned condensations, is however not sufficiently mobile for using the compositions as cation exchangers before negative groups have been introduced therein, such as nitro groups, particularly in the orto positions of the imino group. By nitration of the condensation products with nitric acid the nitro groups will then also enter the orto- and para-positions of the imino groups to the extent in which these are free.

With poly-amino-styrene as base material and condensation with picryl-chloride and subsequent nitration there is produced poly-4'-vinyl-(2.4.6.2'.6'-pentanitrodiphenylamine) with the following formula:

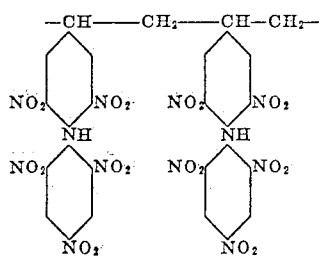

With poly-amino-styrene as base material and the condensation first with 2.4.6.-trichlor-1.3.5.-trinitrobenzene and subsequent condensation with for instance 4-chlor-aniline and subsequent nitration, a compound is obtained having the following formula:

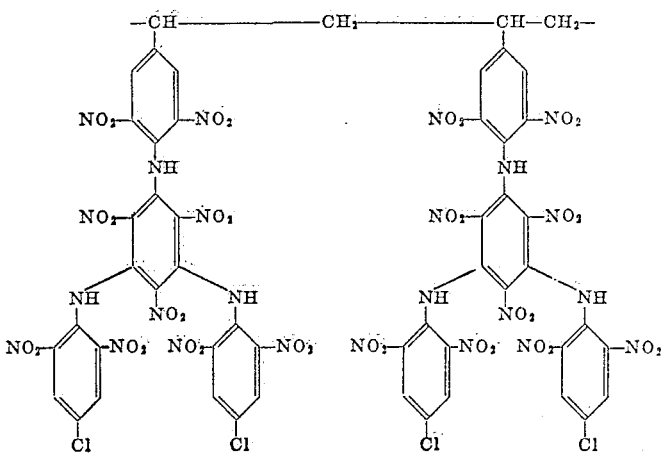

The nitration of these compounds with several imino groups may also take place in two or more stages, nitration following upon each condensation.

In order to obtain an exchanger with suitable granular dimensions and mechanical properties one may either start with a macromolecular cyclic amine with the correct granular dimensions and porosity and maintain these properties during the production processes, or one may work with finely divided material and then finally give the exchanger correct granular dimensions and mechanical properties by briquetting while maintaining the capilar pores in the presence for instance of water.

Below is given an example of how these new compounds are produced:

*Example*

100 g. poly-amino-styrene with anion capacity 2.3 mekv./g. is boiled for 4 hours with 65 g. picrylchloride dissolved in alcohol. The output of the condensation product is 140 g. The product is nitrated in fuming nitric acid while being cooled to +10°. The condensation product is red-brown, the nitrated product yellow. The powdered nitration product is briquetted in the presence of water. Capacity 1.5 mekv./g.

I claim:

1. In a process for the production of potassium compounds from potassium-containing solutions by means of ion exchangers, the step which comprises conducting the solution through an ion exchanger comprising metal compounds of poly-vinyl-pentanitro-diphenylamine.

2. In a process for the production of potassium compounds from potassium-containing solutions by means of ion exchangers, the step which comprises conducting the solution through an ion exchanger comprising calcium compounds of a mixture of poly-4'-vinyl-(2.4.6.2'.6'-pentanitro-diphenylamine) and poly-2'-vinyl-(2.4.6.4'.6'-pentanitro-diphenylamine).

3. In a process for the production of potassium compounds from potassium containing aqueous solutions by means of an ion exchanger, the step which comprises conducting the solution through an ion exchanger selected from the group consisting of poly-4'-vinyl-(2,4,6,2',6' pentanitro-diphenylamine), metal compounds of poly-4'-vinyl - (2,4,6,2',6' pentanitro - diphenylamine), poly - 2'-vinyl - (2,4,6,4',6' pentanitro - diphenylamine and metal compounds of poly-2'-vinyl-2,4,6,4',6' pentanitro-diphenylamine).

ANDERS SKOGSEID.

REFERENCES CITED

The following references are of record in the file of this patent:

UNITED STATES PATENTS

| Number | Name | Date |
|---|---|---|
| 1,978,447 | Austerweil et al. | Oct. 30, 1934 |
| 2,413,784 | Rawlings | Jan. 7, 1947 |
| 2,413,791 | Shafor | Jan. 7, 1947 |

FOREIGN PATENTS

| Number | Country | Date |
|---|---|---|
| 63,914 | Norway | Feb. 13, 1940 |